United States Patent
Miyata

(10) Patent No.: US 9,397,994 B2
(45) Date of Patent: Jul. 19, 2016

(54) PACKET FORWARDING DEVICE, PACKET FORWARDING SYSTEM, AND PACKET FORWARDING METHOD

(71) Applicant: YOKOGAWA ELECTRIC CORPORATION, Musashino-shi, Tokyo (JP)

(72) Inventor: Hiroshi Miyata, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/416,477

(22) PCT Filed: Jul. 24, 2013

(86) PCT No.: PCT/JP2013/070026
§ 371 (c)(1),
(2) Date: Jan. 22, 2015

(87) PCT Pub. No.: WO2014/017532
PCT Pub. Date: Jan. 30, 2014

(65) Prior Publication Data
US 2015/0195267 A1    Jul. 9, 2015

(30) Foreign Application Priority Data
Jul. 24, 2012  (JP) .................................. 2012-163794

(51) Int. Cl.
*H04L 29/06*  (2006.01)
*G06F 21/64*  (2013.01)
(Continued)

(52) U.S. Cl.
CPC ................ *H04L 63/08* (2013.01); *G06F 21/64* (2013.01); *H04L 9/3226* (2013.01); *H04L 63/00* (2013.01); *H04L 63/062* (2013.01); *H04L 63/1408* (2013.01); *H04L 45/74* (2013.01)

(58) Field of Classification Search
CPC ..... H04L 63/00; H04L 63/02; H04L 63/0277; H04L 63/0236; H04L 63/12; H04L 63/123; H04L 63/14; H04L 63/1408; H04L 63/1483; H04L 9/0643; H04L 9/12; H04L 9/32; H04L 9/3236; H04L 9/3242; H04L 9/3247; H04L 45/74; G06F 21/64

See application file for complete search history.

(56) References Cited

U.S. PATENT DOCUMENTS 6,557,112 B1 *  4/2003  Shimada ............. H04L 43/0847
                                                370/222
7,774,498 B1 *  8/2010  Kraemer ................. H04L 63/20
                                                709/224

(Continued)

FOREIGN PATENT DOCUMENTS

JP    2005-12468 A    1/2005
JP    2006-5425 A     1/2006

(Continued)

OTHER PUBLICATIONS

Kent, "IP Authentication Header: Network Working Group RFC 4302: IP Authentication Header" [Online], Dec. 2005 [Retrieved Dec. 9, 2015], The Internet Society, Retrieved from: < http://tools.ietf.org/pdf/rfc4302.pdf>.*

(Continued)

*Primary Examiner* — Eric W Shepperd
(74) *Attorney, Agent, or Firm* — Sughrue Mion, PLLC

(57) ABSTRACT

A packet forwarding device includes: an evaluation unit configured to judge whether or not authentication information is stored in a header, the authentication information being for authenticating communication quality control information stored in the header of a packet transmitted via a network, and evaluate whether or not the authentication information is proper, the evaluation being made when the authentication information is stored in the header; and a forwarding unit that configured to control a communication quality using the communication quality control information, and forward the packet toward a transmission destination, the control being made when the authentication information is evaluated by the evaluation unit to be proper.

16 Claims, 12 Drawing Sheets

(51) Int. Cl.
*H04L 9/32* (2006.01)
*H04L 12/741* (2013.01)

(56) References Cited

U.S. PATENT DOCUMENTS

| | | | | |
|---|---|---|---|---|
| 8,191,133 B2* | 5/2012 | Khanna | H04L 63/1466 | 726/12 |
| 8,646,090 B1* | 2/2014 | Gadde | H04L 12/6418 | 726/13 |
| 8,824,472 B2* | 9/2014 | Carney | H04L 63/1466 | 370/392 |
| 8,948,206 B2* | 2/2015 | Pelletier | | 370/477 |
| 2002/0083020 A1* | 6/2002 | Leon | G07B 17/00024 | 705/401 |
| 2003/0227880 A1* | 12/2003 | Heller | H04L 47/10 | 370/328 |
| 2003/0231597 A1* | 12/2003 | Hester | H04L 25/0202 | 370/252 |
| 2004/0125797 A1* | 7/2004 | Raisanen | H04L 45/12 | 370/389 |
| 2005/0086273 A1* | 4/2005 | Loebbert | H04W 84/20 | |
| 2006/0198378 A1* | 9/2006 | Rajahalme | H04L 12/66 | 370/395.4 |
| 2006/0215548 A1* | 9/2006 | Le Faucheur | H04L 45/22 | 370/228 |
| 2006/0274693 A1* | 12/2006 | Nikander | H04W 36/0016 | 370/331 |
| 2007/0030848 A1* | 2/2007 | Miyata | H04L 12/4633 | 370/389 |
| 2007/0136609 A1* | 6/2007 | Rudelic | G06F 21/606 | 713/193 |
| 2007/0162740 A1* | 7/2007 | Relan | H04L 63/0281 | 713/153 |
| 2008/0089342 A1* | 4/2008 | Lansing | H04N 7/17318 | 370/392 |
| 2008/0192646 A1* | 8/2008 | Song | H04L 47/10 | 370/252 |
| 2008/0192763 A1* | 8/2008 | Davis | H04L 12/2801 | 370/412 |
| 2008/0225743 A1* | 9/2008 | Damnjanovic | H04L 47/10 | 370/252 |
| 2009/0105850 A1* | 4/2009 | Miyata | G05B 19/042 | 700/28 |
| 2009/0213726 A1* | 8/2009 | Asati | H04L 1/007 | 370/216 |
| 2009/0313698 A1* | 12/2009 | Wahl | H04L 63/1416 | 726/22 |
| 2011/0119534 A1* | 5/2011 | Liu | H04L 29/12915 | 714/48 |
| 2012/0047573 A1* | 2/2012 | Duncan | H04L 29/12915 | 726/13 |
| 2012/0096106 A1* | 4/2012 | Blumofe | G06Q 50/00 | 709/213 |
| 2012/0189022 A1* | 7/2012 | Gu | H04L 12/2872 | 370/462 |
| 2013/0290792 A1* | 10/2013 | Torla | G06F 7/58 | 714/49 |

FOREIGN PATENT DOCUMENTS

| | | |
|---|---|---|
| JP | 2006-211233 A | 8/2006 |
| JP | 2010-283612 A | 12/2010 |
| JP | 2011-142441 A | 7/2011 |
| WO | 2004/059923 A2 | 7/2004 |
| WO | 2010/142354 A1 | 12/2010 |

OTHER PUBLICATIONS

R. Braden, et al., "Resource ReSerVation Protocol (RSVP)", RFC 2205, Version 1 Functional Specification, Network Working Group, Sep. 1997, pp. 1-112.

K. Nichols, et al., "Definition of the Differentiated Services Field (DS Field) in the IPv4 and IPv6 Headers", RFC2474, Network Working Group, Dec. 1998, pp. 1-20.

\* cited by examiner

PACKET FORWARDING DEVICE, PACKET FORWARDING SYSTEM, AND PACKET FORWARDING METHOD

CROSS REFERENCE TO RELATED APPLICATIONS

This application is a National Stage of International Application No. PCT/JP2013/070026 filed Jul. 24, 2013, claiming priority based on Japanese Patent Application No. 2012-163794, filed Jul. 24, 2012, the contents of all of which are incorporated herein by reference in their entirety.

TECHNICAL FIELD

The present invention relates to a packet forwarding device, a packet forwarding system, and a packet forwarding method.

BACKGROUND ART

As is widely known, an IP network, a representative example of which is the Internet, is basically a best-effort network. A best-effort network is one in which, although a best effort is made to achieve communication quality, there is no guarantee of quality. In such as best-effort network, because there is not necessarily a guarantee that a transmitted packet will be delivered, the time of delivery and timing interval of delivery are not guaranteed. However, because services such as voice and video communication require real-time performance, it is necessary to guarantee the delivery time and delivery time interval of packets to some degree. Real-time performance is performance in which there is almost no transfer delay (latency). For this reason, in an IP network, communication quality control technology called QoS (quality of service) is used to raise the priority level or maintain a certain communication speed of particular traffic in certain communication, while being based on the above-described best-effort communication.

In this case, typical forms of the above-noted QoS technology include DiffServ (differentiated services) disclosed in Non-Patent Reference 1 noted below and RSVP (Resource Reservation Protocol) disclosed in Non-Patent Reference 2 noted below. The above-noted DiffServ is a technology that controls the priority handling of packets, in accordance with a value stored in a particular field of the packet (for example, the DSCP (Differentiated Service Code Point) in the header of a packet conforming to IPv6). The above-noted RSVP is technology for guaranteeing quality on a communication path in an IP network, by reserving bandwidth up until the transmission destination in the IP network and by transmitting a packet using the reserved bandwidth.

Patent Reference 1 noted below discloses technology for reducing time jitter in IP packet forwarding using such QoS technology.

The above-described QoS technology is not restricted to the Internet, and is used in networks requiring real-time performance. It is used, for example, in a network that forms a part of a distributed control system (DCS) implemented in a plant or factory. In a distributed control system, on-site devices (measuring instruments and actuators) known as field devices are connected with a management device managing and controlling the on-site devices, via a cable or wireless network. In this distributed control system, because various state quantities (such as pressure, temperature, and flow amount) in an industrial process must be controlled with high precision, real-time performance is important.

PRIOR ART REFERENCES

[Patent Reference]

[Patent Reference 1] Japanese Patent Application Publication No. 2006-211233

[Non-Patent References]

[Non-Patent Reference 1] RFC 2474, Definition of the Differentiated Services Field (DS Field) in the IPv4 and IPv6 Headers

[Non-Patent Reference 2] RFC 2205, Resource ReSerVation Protocol (RSVP) Version 1 Functional Specification

SUMMARY OF THE INVENTION

Problem to Be Solved by the Invention

QoS technologies such as the above-described DiffServ and RSVP control the priority level and bandwidth using a value stored in a packet. For this reason, storage of the correct value in the packet is a prerequisite. In this case, the value used by the above-described DiffServ (value stored in the DSCP field of the header) is stored at the transmission source device, which is packet transmission source, or at the router (first-hop router) that first forwards the packet from the transmission source device. The transmission source device stores the value used by the above-described RSVP (information such as the transmission source address, transmission destination address, transmission source port, transmission destination port, and protocol included in the header and an upstream protocols). Devices other than the transmission source device and first-hop router control the priority level and bandwidth on the assumption that the value stored in the transmitted packet is correct.

Therefore, for example, a malevolent third party, by connecting a device corresponding to the above-described transmission source device to a network and by transmitting a packet having stored therein an erroneous value to the network, might cause a fault in the network. Specifically, for example, if a packet storing a value corresponding to the highest priority, or a packet storing information (such as transmission source address, transmission destination address, transmission source port, transmission destination port, and protocol) identifying communication to be subjected to a fault is counterfeited and transmitted, it is possible that attacks delaying the delivery time of a packet which should normally be given priority, or leading to loss are facilitated.

The present invention provides a packet forwarding device, a packet forwarding system, and a packet forwarding method capable of preventing the influence of counterfeited packets.

Means to Solve the Problem

A first aspect of the present invention is a packet forwarding device including: an evaluation unit configured to judge whether or not authentication information is stored in a header, the authentication information being for authenticating communication quality control information stored in the header of a packet transmitted via a network, and evaluate whether or not the authentication information is proper, the evaluation being made when the authentication information is stored in the header; and a forwarding unit that configured to control a communication quality using the communication quality control information, and forward the packet toward a transmission destination, the control being made when the authentication information is evaluated by the evaluation unit to be proper.

According to the first aspect of the present invention, a communication quality control using a communication quality control information is performed, and a forwarding of a packet toward a transmission destination is performed, when an authentication information (information for authentication of the communication quality control information stored in a header of the packet) is evaluated by the evaluation unit, and the authentication information is evaluated as proper by the evaluation unit.

In the first aspect of the present invention, the packet forwarding device may include: a calculation unit configured to calculate the authentication information using at least pre-established communication quality control information, the calculation being made when the authentication information is not stored in the header of the packet; and a packet processor configured to generate, as a packet to be transmitted toward the transmission destination, a packet in which the pre-established communication quality control information and the authentication information calculated by the calculation unit are added to the header.

In the first aspect of the present invention, the forwarding unit may be configured to control communication quality using the pre-established communication quality control information and forward the packet generated by the packet processor toward the transmission destination.

In the first aspect of the present invention, the packet forwarding device further includes: a storage unit that stores a previously distributed secret shared key, wherein the evaluation unit may be configured to evaluate the authentication information, based on information calculated using the secret shared key stored in the storage unit and at least the communication quality control information stored in the header of the packet.

In the first aspect of the present invention, the packet forwarding device may further include: a storage unit that stores a previously distributed secret shared key, wherein the calculation unit may be configured to calculate the authentication information using the secret shared key stored in the storage unit and at least the pre-established communication quality control information, and the evaluation unit may be configured to evaluate the authentication information, based on information calculated using the secret shared key stored in the storage unit and at least the communication quality control information stored in the header of the packet.

In the first aspect of the present invention, the packet may be discarded when the evaluation unit evaluates the authentication information to be improper.

In the first aspect of the present invention, when the evaluation unit evaluates the authentication information to be proper, the forwarding unit may be configured to judge, based on the header, whether or not the packet is addressed to its own packet forwarding device.

In the first aspect of the present invention, when the packet is judged by the forwarding unit to be addressed to its own packet forwarding device, the forwarding unit, after deleting the header, may be configured to perform the communication quality control and the forwarding.

In the first aspect of the present invention, when the packet is judged by the forwarding unit not to be addressed to its own packet forwarding device, the forwarding unit may be configured to perform the communication quality control and the forwarding.

In the first aspect of the present invention, the packet forwarding device may include: a storage unit that stores information regarding whether or not it is necessary to add the extended header to the packet, wherein when the evaluation unit evaluates that the authentication information is not stored in the header, a judgment may be configured to judge as to whether or not the packet requires the addition of an extended header, based on information stored in the storage unit.

In the first aspect of the present invention, the packet may be discarded when the judgment is made, based on information stored in the storage unit, that the packet requires the addition of the extended header.

In the first aspect of the present invention, the storage unit may further store a storage unit storing information regarding whether or not the packet requires counterfeiting prevention, wherein when the judgment is made, based on information stored in the storage unit, that the packet may not require the addition of the extended header, a judgment is made, based on information stored in the storage unit, regarding whether or not the packet requires counterfeiting prevention.

In the first aspect of the present invention, the communication quality control information may be stored into a header different from the header when the judgment is made, based on information stored in the storage unit, that the packet requires counterfeiting prevention.

In the first aspect of the present invention, the communication quality control information may be stored into the header when the judgment is made, based on information stored in the storage unit, that the packet does not require counterfeiting prevention.

In the first aspect of the present invention, the packet processor may include in a packet to be transmitted toward the transmission destination a sequence number indicating the transmission sequence of a group of packets to be successively transmitted toward the transmission destination.

In the first aspect of the present invention, the packet processor may include in a packet to be transmitted toward the transmission destination a random number for the purpose of making the authentication information different for each packet.

A second aspect of the present invention is a packet forwarding system including: a field device; at least one packet forwarding device; and a controller configured to control the field device via the at least one packet forwarding device, wherein each of the at least one packet forwarding devices includes: an evaluation unit configured to judge whether or not authentication information is stored in a header, the authentication information being for authenticating communication quality control information stored in the header of a packet transmitted from the field device in the header, and evaluate whether or not the authentication information is proper, the evaluation being made when the authentication information is stored in the header; and a forwarding unit configured to control a communication quality using the communication quality control information, and forward the packet toward the controller, the control being made when the authentication information is evaluated by the evaluation unit to be proper.

A third aspect of the present invention is a packet forwarding method including: judging whether or not authentication information is stored in a header, the authentication information being for authenticating communication quality control information stored in the header of a packet transmitted via a network; evaluating whether or not the authenticating information is proper, the evaluation being made when the judgment is made that the authentication information is stored in the header; and controlling a communication quality using the communication quality control information, and forwarding the packet toward a transmission destination the control being made when the authentication information is evaluated to be proper.

In the third aspect of the present invention, the packet forwarding method may include: calculating the authentication information using at least pre-established communication quality control information when the judgment is made that the authentication information is not stored in the header; generating a packet in which the pre-established communication quality control information and the calculated authentication information are added to the header; and controlling communication quality using the pre-established communication quality control information and forwarding the generated packet toward the transmission destination.

Effect of the Invention

In an aspect of the present invention, if an evaluation unit evaluates that authentication information stored in the header of a packet (information stored in the packet header for the purpose of authenticating the communication quality control information) is proper, a forwarding unit controls the communication quality using the communication quality control information and forwards the packet to the transmission destination. For this reason, in an aspect of the present invention, it is possible to prevent the influence of counterfeit packets.

EMBODIMENT FOR CARRYING OUT THE INVENTION

A packet forwarding device, a packet forwarding system, and a packet forwarding method according to the first embodiment to the third embodiment of the present invention will be described in detail below, with references made to the drawings.

First Embodiment

Overall Communication System Constitution

Figure 1:
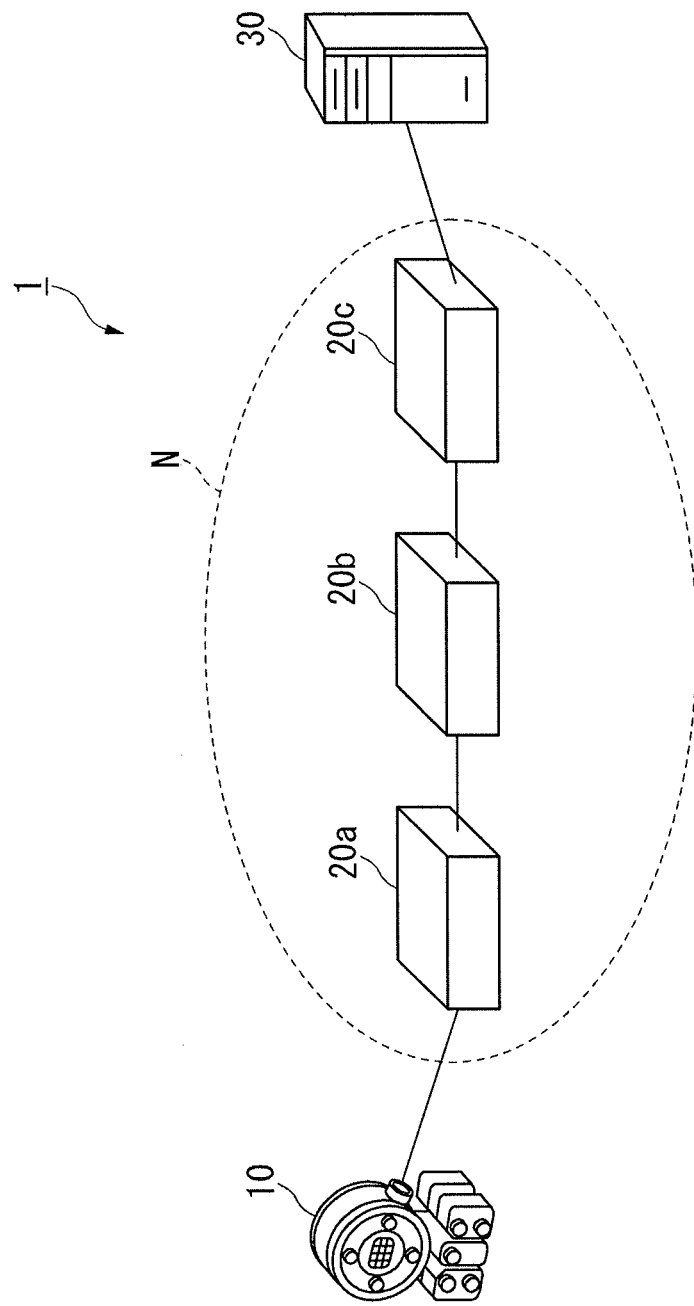
FIG. 1 is a block diagram showing the overall constitution of a communication system using a packet forwarding device according to a first embodiment of the present invention.

FIG. 1 is a block diagram showing the overall constitution of a communication system 1 in which packet forwarding devices 20a to 20c according to the first embodiment of the present invention are used. As shown in FIG. 1, the communication system 1 has a field device 10, routers 20a to 20c (packet forwarding devices), and a controller 30. In the communication system 1, communication between the field device 10 and the controller 30 is possible via a network N constituted by the routers 20a to 20c.

The communication system 1 shown in FIG. 1 is based on a distributed control system (DCS) implemented in a plant, a factory, or the like. In FIG. 1, to facilitate understanding, the illustration shows only one field device 10 is connected to the network N and network N being constituted by the three routers 20a to 20c. However, the number of the field devices and routers is arbitrary.

The field device 10 is a sensor device such as a flow amount gage or temperature sensor, a valve device such as a flow control valve or open/close valve, an actuator device such as a fan or motor, or another device installed on-site in a plant or factory. The controller 30 controls the operation of the field device 10. The field device 10 measures the object of measurement (for example, flow amount, temperature, valve opening, or motor rpm) and transmits the results of the measurement to the controller 30. The field device 10 is connected by cable connection or wireless connection to the network N.

The routers 20a to 20c constitute the network N to which the field device 10 and the controller 30 are connected. The routers 20a to 20c forward to the transmission destination packets transmitted via the network N. For example, the routers 20a to 20c forward a packet transmitted from the field device 10 toward the controller 30. In this case, the routers 20a to 20c may be mutually connected either by cable or wirelessly.

In the first embodiment, to facilitate understanding, the case in which the routers 20a to 20c are connected in series between the field device 10 and the controller 30 will be described as shown in FIG. 1. For this reason, the router 20a connected to the field device 10 and the router 20c connected to the controller 30 are disposed at the edges of the network N (and are so-called edge routers).

The controller 30 controls the field device 10 via the network N. The controller 30 also collects various data obtained by controlling the field device 10, via the network N.

(Field Device Constitution)

Figure 2:
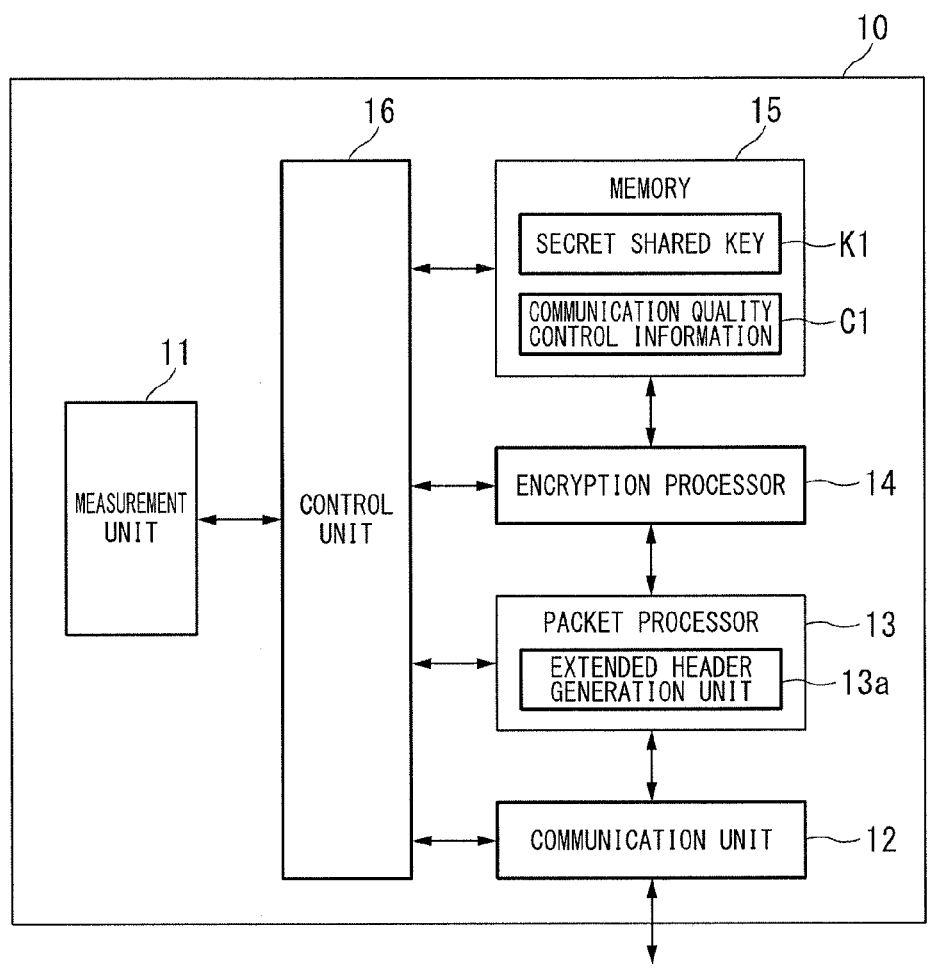
FIG. 2 is a block diagram showing the constitution of the main parts of a field device provided in a communication system.

FIG. 2 is a block diagram showing the constitution of the main parts of the field device 10 provided in the communication system. As shown in FIG. 2, the field device 10 has a measurement unit 11, a communication unit 12, a packet processor 13, an encryption processor 14, a memory 15, and a control unit 16. The field device 10, under the control of the controller 30, for example, transmits a packet that includes the above-noted measurement results of the object of measurement.

The measurement unit 11 measures the above-described object of measurement and outputs measurement data indicating the measurement result to the control unit 16. The communication unit 12, under control of the control unit 16, receives a packet transmitted via the network N. The measurement unit 11 transmits a packed addressed to the controller 30 via the network N. The packet processor 13, under the control of the control unit 16, performs processing related to packets transmitted and received by the communication unit 12. For example, the packet processor 13 performs extraction of specific data from a packet received at the communication unit 12. The packet processor 13 also generates a packet (packet in which the measurement results of the measurement unit 11 are stored) for transmission via the communication unit 12.

The packet processor 13 has an extended header generation unit 13a. The extended header generation unit 13a generates an extended header, in which an original header (basic header) usually provided in a packet is extended. The extended header is a header in which, for example, a message authentication code (authentication information) for the purpose of authenticating the communication quality control information used in QoS technology (communication quality control technology) is stored. Specifically, the communication quality control information is the DSCP value used in DiffServ or a value used in RSVP. The format of the packet generated by the packet processor 13 will be described in detail later.

The encryption processor 14 uses a secret shared key K1 stored in the memory 15 to calculate the above-noted message authentication code. Specifically, the encryption processor 14 uses the packet to be transmitted (packet to which the extended header is not added) and the secret shared key K1 to calculate (for example to calculate HMAC-SHA1 or HMAC-MD5) the message authentication code known as the HMAC (keyed-hashing for message authentication code).

The memory 15 stores the above-noted secret shared key K1 and communication quality control information C1 used in QoS technology. In this case, the secret shared key K1 is a secret key shared between the field device 10 and the routers 20a to 20c, which is distributed, for example, from the controller 30. The communication quality control information C1 is information for the purpose of controlling the priority level of packets transmitted from the field device 10 and of controlling the bandwidth (specifically, the DSCP value used in DiffServ or the value used in RSVP). The communication quality control information C1 is, for example, set beforehand by the controller 30, or manually set into the field device 10 beforehand by a worker.

Although the illustration in FIG. 2 is simplified for the purpose of the description, the communication quality control information C1 is stored into a table in which various information required to perform communication quality control is stored. Specifically, in the case of DiffServ, this table has a plurality of records, into which the transmission source address, the transmission destination address, the protocol used, the transmission source port, the transmission destination port, and the DSCP value (communication quality control information C1) are stored.

The control unit 16 performs overall control of the operation of the field device 10. For example, it controls the communication unit 12, the packet processor 13, and the encryption processor 14 to control the transmission and reception of packets. In this case, when controlling packet transmission, the control unit 16 controls whether or not an extended header, in which the communication quality control information C1 stored in the memory 15 is included in the packet to be transmitted, is to be added.

If the extended header is to be added, the control unit 16 controls the encryption processor 14 so as to calculate a message authentication code to be stored in the extended header.
(Packet Forwarding Device Constitution)

Figure 3:
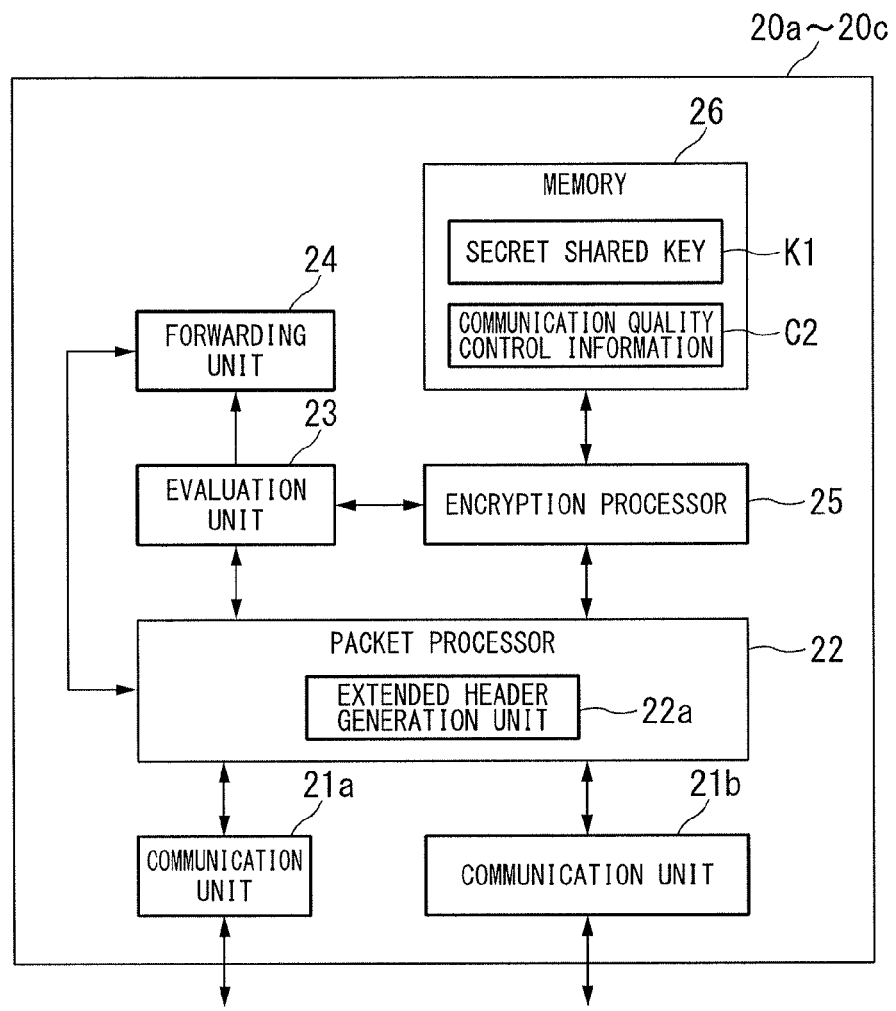
FIG. 3 is a block diagram showing the constitution of the main parts of a router as a packet forwarding device according to the first embodiment of the present invention.

FIG. 3 is a block diagram showing the constitution of the main parts of the routers 20a to 20c as packet forwarding devices according to the first embodiment of the present invention. As shown in FIG. 3, the routers 20a to 20c have communication units 21a and 21b, a packet processor 22, an evaluation unit 23, a forwarding unit 24, an encryption processor 25 (calculation unit), and a memory 26 (storage unit). The routers 20a to 20c forward packets transmitted via the network N to the transmission destination.

The communication units 21a and 21b receive packets transmitted via the network N, and transmit packets to the network N. For example, if a packet is transmitted from the field device 10 to the controller 30 via the network N, the communication units 21a provided in the routers 20a to 20c receive a packet transmitted from the field device 10 via the network N. The communication unit 21b provided in the routers 20a to 20c transmits a packet addressed to the controller 30 via the network N. Although, to facilitate understanding, FIG. 3 illustrates a constitution having two communication units 21a and 21b, the communication units 21a and 21b may be integrated into one.

The packet processor 22 performs processing related to packets transmitted and received by the communication units 21a and 21b. For example, it extracts specific data from a packet received by the communication units 21a and 21b. The packet processor 22 also generates packets to be transmitted via the communication units 21a and 21b. The packet processor 22, similar to the packet processor 13 provided in the field device 10, has an extended header generation unit 22a. The extended header generation unit 22a generates an extended header (header storing a message authentication code or the like), in which an original header (basic header) provided in a packet is extended.

The format of the packet generated by the packet processor 22 will be described in detail later.

The evaluation unit 23 evaluates the message authentication code when a message authentication code for the purpose of authenticating the communication quality control information C1 stored in the header of a packet received by the communication units 21a and 21b is stored in the header (extended header). Specifically, the evaluation unit 23 makes the encryption processor 25 calculate a message authentication code using the received packet (packet without the extended header) and the secret shared key K1. The evaluation unit 23 then judges whether or not the message authentication code stored in the extended header of the received packet is the same as the message authentication code obtained by the encryption processor 25. If these message authentication codes coincide, the evaluation unit 23 evaluates the message authentication code stored in the extended header of the received packet as being proper.

The forwarding unit 24 controls the forwarding of packets. Specifically, if the evaluation unit 23 has evaluated that the message authentication code stored in the extended header of a packet received by the communication units 21a and 21b is proper, the forwarding unit 24 performs communication quality control using the communication quality control information C1 stored in the header of the received packet, and forwards the received packet toward the transmission destination. If there is no extended header into which the message authentication code is stored in the packets received by the communication units 21a and 21b, the forwarding unit 24 performs communication quality control using the communication quality control information C2 stored in a memory 26, and forwards the packet generated by the packet processor 22 to the transmission destination. In the packet generated by the packet processor 22, the header (basic header) includes the communication quality control information C2, and has a header (extended header) storing a message authentication code authenticating the communication quality information C2 added thereto.

The encryption processor 25, similar to the encryption processor 14 provided in the field device 10, generates the above-noted message authentication code using the secret shared key K1 stored in the memory 26. The memory 26 stores the secret shared key K1 and the communication quality control information C2 (pre-established communication quality control information) used in QoS technology. In this case, the secret shared key K1 is the same as the secret shared key K1 stored in the memory 15 of field device 10 and is, for example, distributed from the controller 30. The communication quality control information C2 is for the purpose of controlling the priority level or bandwidth when forwarding a received packet (specifically, the DSCP value used in DiffServ or the value used in RSVP). The communication quality control information C2 is, for example, set beforehand by the controller 30, or manually set beforehand into the routers 20a to 20c by a worker. The communication quality control information C2 may be the same as or differ from the communication quality control information C1 stored in the memory 15 of the field device 10.

Although, to facilitate understanding, the illustration in FIG. 3 has been simplified, the communication quality control information C2, similar to the communication quality control information C1 shown in FIG. 2, is stored into a table in which various information required to perform communication quality control is stored. Specifically, in the case of DiffServ, this table has a plurality of records, into which the transmission source address, the transmission destination address, the protocol used, the transmission source port, the transmission destination port, and the DSCP value (communication quality control information C2) are stored.

(Packet Format)

Figure 4:
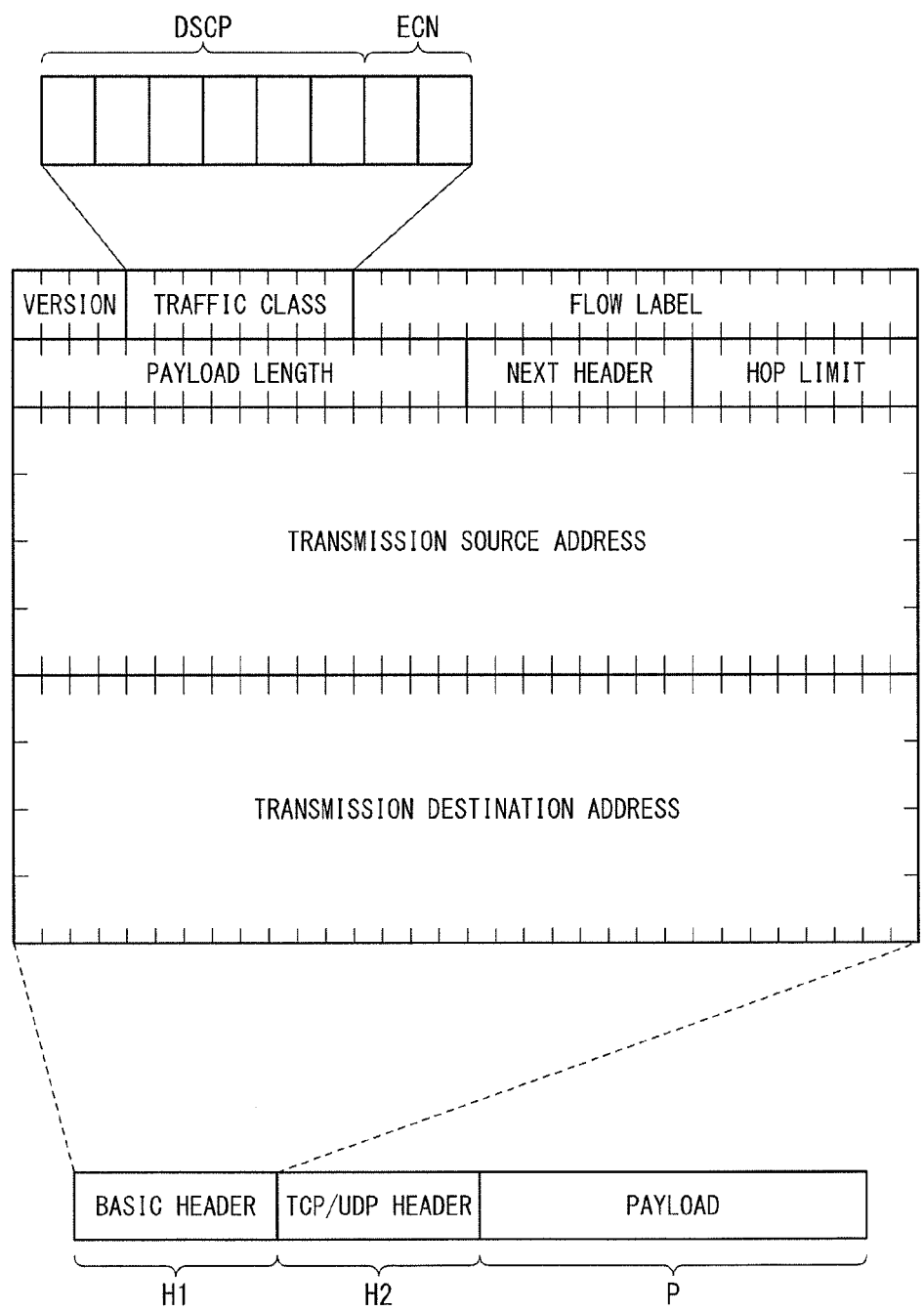
FIG. 4 is a drawing showing the basic format of a packet used in the first embodiment of the present invention.

FIG. 4 shows the basic format of a packet used in the first embodiment of the present invention. The packet used in the first embodiment conforms to IPv6 (Internet Protocol Version 6), and is constituted by a basic header H1, a TCP/UDP (Transmission Control Protocol/User Datagram Protocol) header H2, and a payload P. The basic header H1 stores various information necessary for packet forwarding. The TCP/UDP header H2 stores various information necessary for performing TCP/UDP processing. The payload P stores various data to be transmitted (for example, measurement data measured by the field device 10).

In this case, the eight fields Version, Traffic Class, Flow Label, Payload Length, Next Header, Hop Limit, Source Address, and Destination Address constitute the basic header H1. Of these fields, the Traffic Class field is an 8-bit-long field in which information indicating the packet priority level is stored.

Specifically, the above-noted Traffic Class field is provided with a 6-bit-long DSCP field storing a DSCP value, and which is information used to control the priority level by DiffServ, which is a type of QoS technology. The two bits of the Traffic Class field other than the DSCP field are used for ECN (Explicit Congestion Notification).

When performing control of the priority level by DiffServ, the above-noted DSCP value is used as the communication quality control information C1 stored in the memory 15 of the field device 10 shown in FIG. 2 or the communication quality control information C2 stored in the memory 26 of the routers 20a to 20c shown in FIG. 3. For this reason, the field device 10 might transmit a packet storing the communication quality control information C1 in the DSCP field. Although it will be described in detail later, the routers 20a to 20c may forward a packet storing the communication quality control information C2 in the DSCP field.

Figure 5:
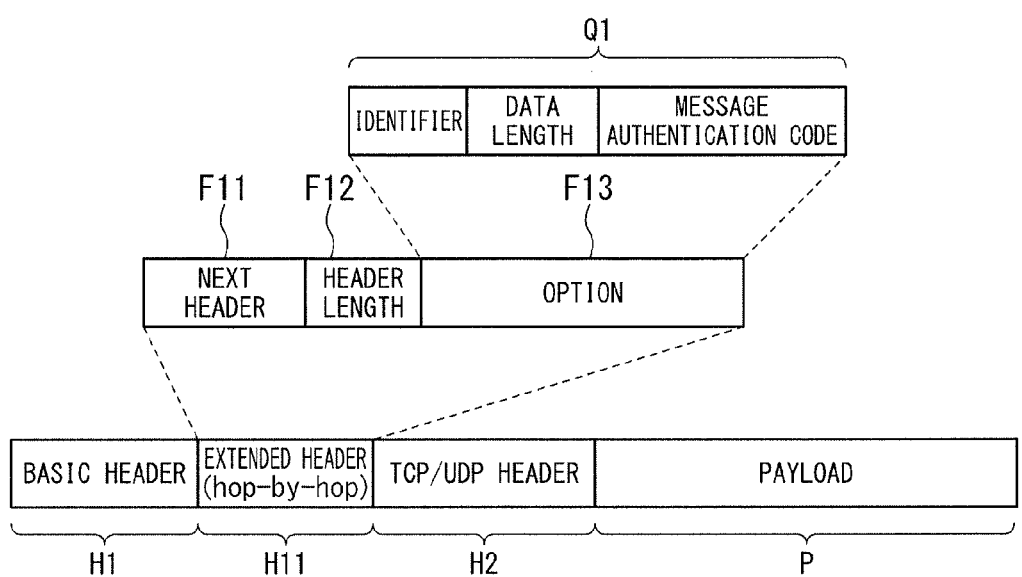
FIG. 5 is a drawing showing the first extended format of a packet used in the first embodiment of the present invention.

FIG. 5 shows the first extended formation of a packet used in the first embodiment of the present invention. A packet having the format shown in FIG. 5 is for the purpose of preventing counterfeiting of communication quality control information (DSCP value or the like) used in QoS technology and is generated, for example, by the field device 10. In the field device 10, if a setting is not made to the effect that prevention of counterfeiting of the communication quality control information is to be done, a packet such as shown in FIG. 4 (packet having the basic format) is generated.

The packet shown in FIG. 5, similar to the packet shown in FIG. 4, conforms to IPv6, and has an extended header H11 added between the basic header H1 and the TCP/UDP header H2 of the packet shown in FIG. 4. The extended header H11 is a header in which information that must be processed each time the packet passes through the routers 20a to 20c is specified (a so-called hop-by-hop option header).

As shown in FIG. 5, the extended header H11 is constituted by a Next Header field F11, a Header Length field F12, and an Option field F13. The Next Header field F11 is a field storing information that indicates the type of the next header (TCP/UDP header H2) following the extended header H11. The Header Length field F12 is a field storing the length after the Header Length field F12 in the extended header H11. The Option field F13 is a field storing information necessary for preventing counterfeiting of communication quality control information.

Specifically, option information Q1, which consists of one set of Identifier, Data Length, and Message Authentication Code is stored in the Option field F13. In this case, the Identifier of the option information Q1 indicates that a Message Authentication Code is included in the option information Q1. The Data Length of the option information Q1 is the data length of the Message Authentication Code included in the option information Q1. The message authentication information of the option information Q1 is authentication information (HMAC) for authenticating the communication quality control information (specifically, the DSCP value stored in the DSCP field of the basic header H1 shown in FIG. 4 or the value used for RSVP). This Message Authentication Code is used in preventing counterfeiting of the communication quality control information (DSCP value or the like).

Figure 6:
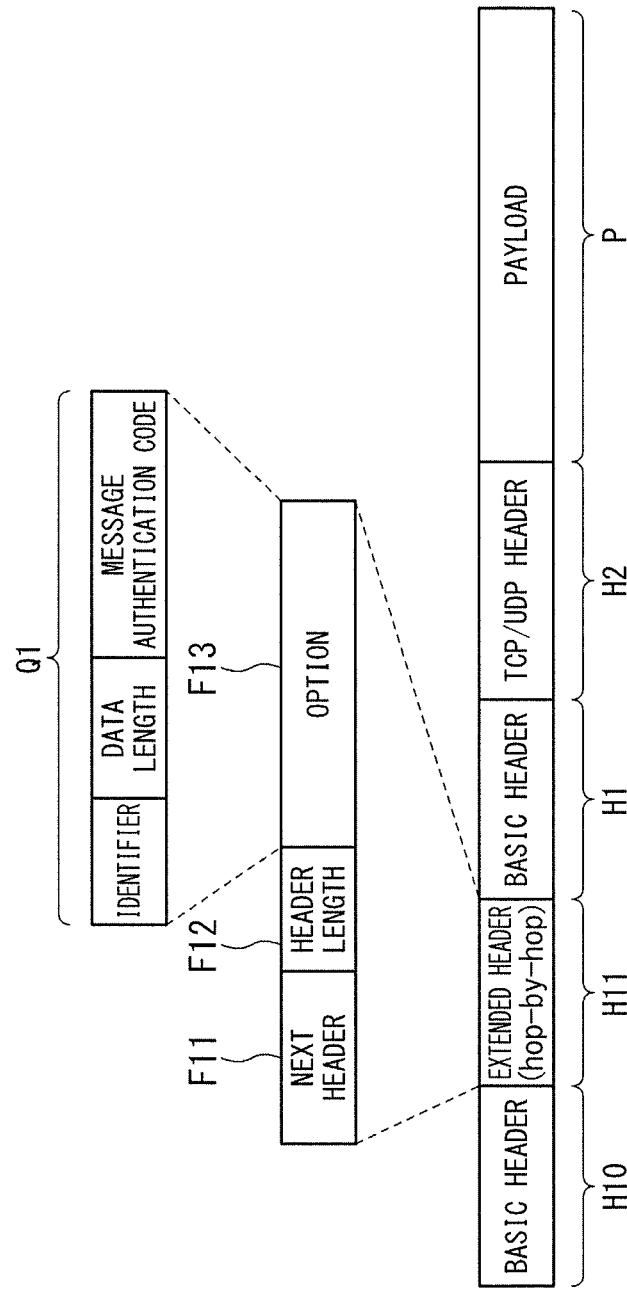
FIG. 6 is a drawing showing the second extended format of a packet used in the first embodiment of the present invention.

FIG. 6 shows the second extended format of a packet used in the first embodiment of the present invention. A packet having the format shown in FIG. 6, similar to the packet shown in FIG. 5, has an anti-counterfeiting measure applied with respect to the communication quality control information (DSCP information or the like) used in QoS technology. A packet having the format shown in FIG. 6 is generated by the routers 20a and 20c as edge routers. If a transmitted packet having the format shown in FIG. 5 has been received, the routers 20a and 20c do not generate a packet (the generation of a packet shown in FIG. 6).

The packet shown in FIG. 6 has the extended header H11 and the basic header H10 added before the basic header H1 of the packed shown in FIG. 4. It could say that the packet shown in FIG. 6 is the packet shown in FIG. 4 with the extended header H11 added thereto and encapsulated by the basic header H10. The extended header H11 is the same as the extended header H11 shown in FIG. 5. The extended header H11 is a hop-by-hop option header in which the message authentication code or the like is stored in the Option field F13.

The basic header H10 has stored therein various information necessary for packet forwarding within the network N (between the router 20a and the router 20c). The fields Version through Transmission Destination Address constitute the basic header H10, similar to the basic header H1 shown in FIG. 4. The basic header H10 is used to forward the packet only within the network N. For this reason, addresses of the edge routers (routers 20a and 20c) are stored in the Transmission Source Address field and the Transmission Destination Address field.

(Communication System Operation)

Figure 7:
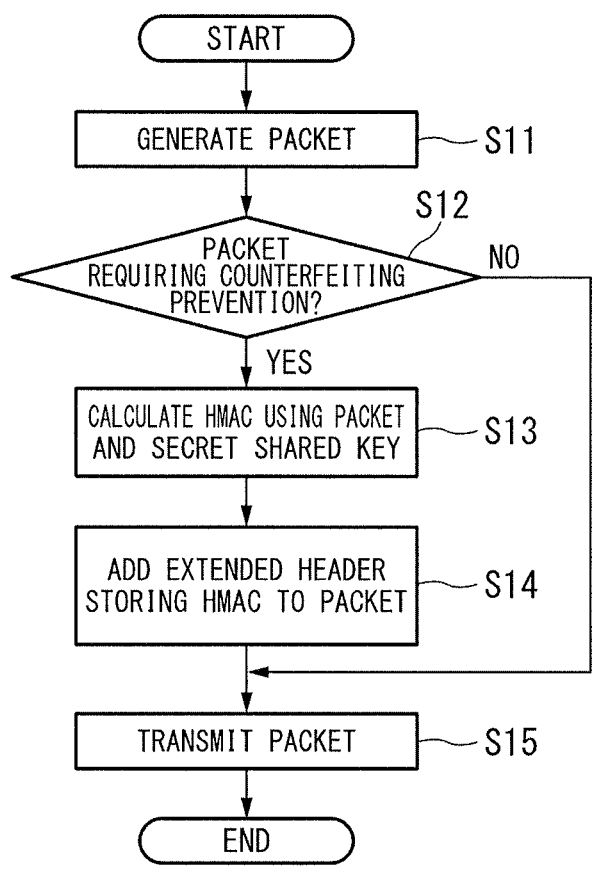
FIG. 7 is a flowchart showing the operation of a field device in the first embodiment of the present invention.
Figure 8:
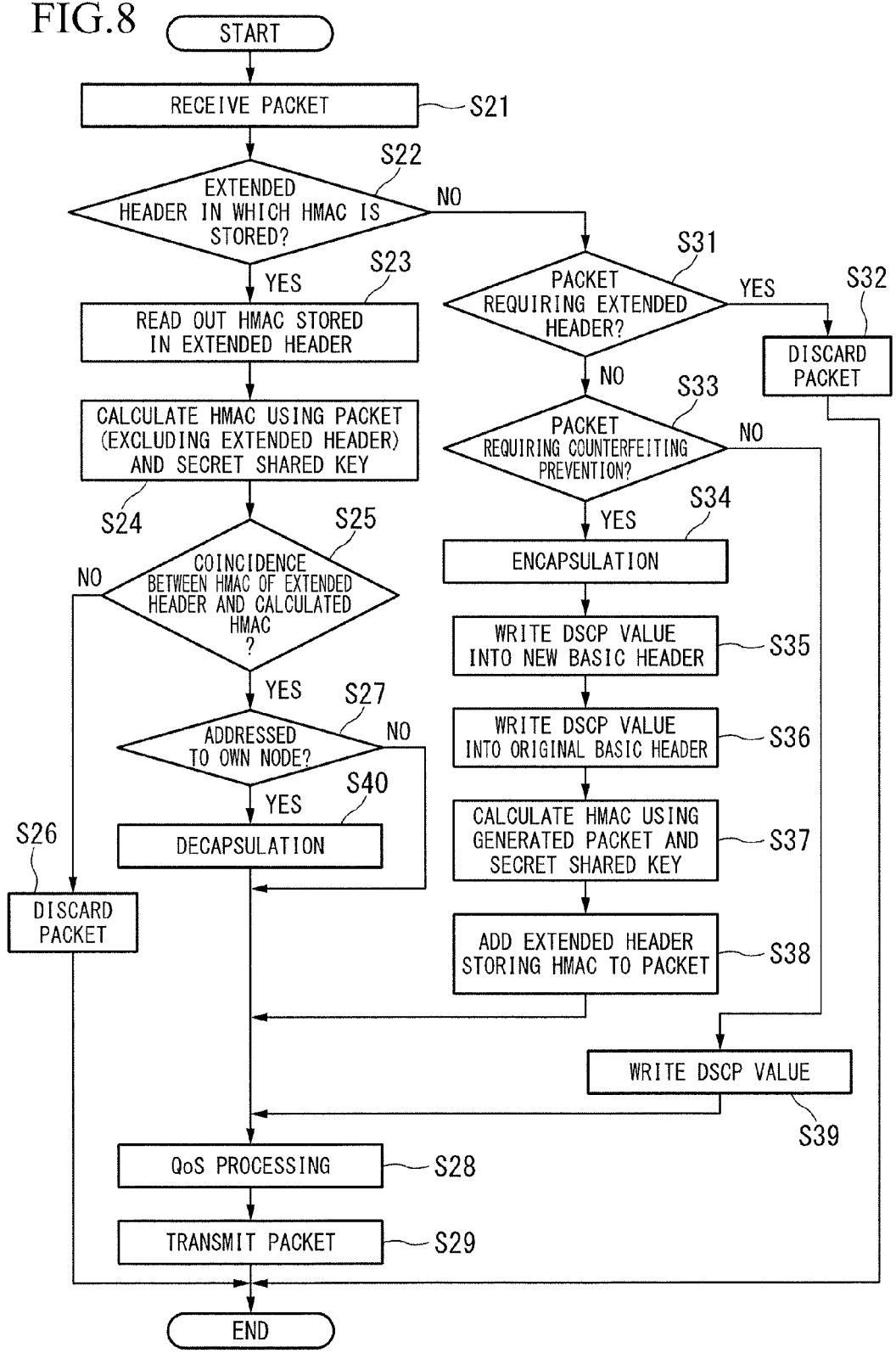
FIG. 8 is a flowchart showing the operation of a router as a packet forwarding device according to the first embodiment of the present invention.

Next, the operation of the communication system 1 will be described. To facilitate understanding, the description will be of operation when DiffServ, which is a type of QoS technology, controls the priority level and a packet generated by the field device 10 is to be transmitted to the controller 30. FIG. 7 is a flowchart showing the operation of the field device 10 in the first embodiment of the present invention, and FIG. 8 is a flowchart showing the operation of the routers 20a to 20c as packet forwarding devices according to the first embodiment of the present invention.

In this case, the operation of the communication system 1 in the first embodiment is generally divided between the operation when the packet generated by the field device 10 includes a message authentication code (HMAC) for authenticating the DSCP value (communication quality control information C1) used in DiffServ (hereinafter "first operation") and the operation when it does not include the message authentication code (hereinafter "second operation").

The first and second operations will be successively described below.

(First Operation)

First, the field device 10 performs processing to generate a packet to be transmitted to the controller 30 (step S11 in FIG. 7). Specifically, the control unit 16 controls the packet processor 13 to store the addresses of the field device 10 and the controller 30, respectively, into the Transmission Source Address and Transmission Destination Address fields of the basic header H1. This generates a packet into which the DSCP value (communication quality control information C1) is stored in the DSCP field (a packet having the basic format shown in FIG. 4). The payload P of the generated packet stores, for example, measurement data indicating measurement results from the measurement unit 11.

Next, the control unit 16 of the field device 10 judges whether or not the packet to be transmitted to the controller 30 is a packet requiring prevention of counterfeiting of the DSCP value (communication quality control information C1) (step S12). Specifically, the control unit 16 judges whether or not the intention to prevent counterfeiting the communication quality control information is set into the field device 10. In the first operation, because this intention is set, the judgment result at step S12 is YES.

Then, the control unit 16 controls the memory 15 and the encryption processor 14 so as to calculate the message authentication code (HMAC), using the target packet (packet in which the DSCP value is written into the DSCP field) and the secret shared key K1 (step S13).

When the message authentication code is calculated, the control unit 16 controls the extended header generation unit 13a of the packet processor 13 so as to add the extended header H11, into which the calculated message calculation code and the like is stored in the Option field F13, to the packet, as shown in FIG. 5 (step S14). When this processing ends, the control unit 16 controls the communication unit 12 so as to transmit the packet to which the extended header H11 has been added to the controller 30.

The packet transmitted from the field device 10 to the controller 30 is first input to the router 20a. The packet input to the router 20a is received by the communication unit 21a and output to the packet processor 22, as shown in FIG. 3 (step 21 in FIG. 8). When the packet is received by the communication unit 21a, in the packet processor 22a, judgment is made of whether or not it has an extended header H11 in which a message authentication code (HMAC) is stored (step S22). In the first operation, because a packet to which the extended header H11 storing a message authentication code (HMAC) is added is transmitted from the field device 10, the judgment result at step S22 is YES.

The message authentication code (HMAC) stored in the extended header H11 is then read out and output by the packet processor 22 to the evaluation unit 23 (step S23). When the message authentication code (HMAC) from the packet processor 22 is input to the evaluation unit 23, in the encryption processor 25, a message authentication code (HMAC) is calculated, using the part of the packet other than the extended header H11 and the secret shared key K1 (step S24).

Next, the evaluation unit 23 evaluates the properness of the message authentication code (HMAC) stored in the extended header H11 of the received packet. Specifically, the evaluation unit 23 judges whether there is coincidence between the message authentication code (HMAC) stored in the extended header H11 of the received packet and the message authentication code (HMAC) calculated by the encryption processor 25 (step S25). If the evaluation unit 23 judges that these message authentication codes (HMACs) do not coincide (when the judgment result is NO), the packet processor 22 performs processing to discard the received packet (step S26) and the processing shown in FIG. 8 is ended.

If the evaluation unit 23 judges that the message authentication codes (HMACs) coincide (when the judgment result at step S25 is YES), the forwarding unit 24 judges whether or not the received packet is addressed to its node (step S27). In this case, the controller 30 address is stored in the Transmission Destination Address field included in the basic header H1 of the received packet, is not addressed to the router 20a. Therefore, the judgment result at step S27 is NO.

The forwarding unit 24 then performs QoS processing (step S28). Specifically, based on the DSCP value (communication quality control information C1) stored in the DSCP field of the basic header H1 of the received packet, the forwarding unit 24 controls the priority level by DiffServ. The forwarding unit 24 then controls the packet processor 22 so that the packet is output to the communication unit 21b and transmitted toward the controller 30 (step S29).

The packet transmitted toward the controller 30 from the router 20a is successively forwarded by the routers 20b and 20c and is then received by the controller 30. At the routers 20b and 20c that receive the packet, the same processing is performed as it was performed at the router 20a. That is, the properness of the message authentication code (HMAC) stored in the extended header H11 of the packet is evaluated and, if the evaluation is that it is proper, QoS processing is done, and then processing to forward the packet is done. If, however, the evaluation is that it is not proper, processing is done to discard the packet. In this manner, a packet suspected of having a counterfeited DSCP value (communication quality control information C1) is discarded at any one of the routers 20a to 20c. Therefore, it is possible to prevent the influence of counterfeited packets.

(Second Operation)

First, similar to the first operation, the field device 10 performs processing to generate a packet to be transmitted to the controller 30 (step S11 in FIG. 7). Next, the control unit 16 of the field device 10 judges whether or not the packet to be transmitted to the controller 30 is a packet requiring prevention of counterfeiting of the DSCP value (communication quality control information C1) (step S12). Specifically, the control unit 16 judges whether or not the intention to prevent counterfeiting the communication quality control information is set into the field device 10. In the second operation, since this intention is not set, the judgment result at step S12 is NO. The control unit 16 then controls the communication unit 12, and a packet having the basic format shown in FIG. 4 (a packet to which the extended header H11 is not added) is transmitted for the controller 30 (step S15).

If the field device 10 does not have a function to prevent counterfeiting of the communication quality control information, the processing of the above-noted step S12 is omitted, and the processing of only steps S11 and S15 is performed. That is, the packet to be transmitted to the controller 30 is generated (step S11), and a packet having the basic format shown in FIG. 4 (a packet to which the extended header H11 is not added) is transmitted toward the controller 30 (step S15).

The packet transmitted for the controller 30 from the field device 10 is first input to the router 20a. The packet input to the router 20a is received by the communication unit 21a shown in FIG. 3 and output to the packet processor 22 (step S21 in FIG. 8). When the packet is received, the packet processor 22 judges whether it has an extended header H11 in which the message authentication code (HMAC) is stored (step S22). In the second operation, because the packet transmitted from the field device 10 is a packet to which the extended header H11 is not added (a packet of the basic format shown in FIG. 4), the judgment result at step S22 is NO.

The packet processor 22 of the router 20a judges whether or not the received packet is a packet normally requiring the above-noted extended header H11 (step S31). Specifically, the packet processor 22 judges whether or not information that the extended header H11 should be added to the packet is stored in the table (the table in which the communication quality control information C2 is stored) stored in the memory 26. If the received packet is judged to require the extended header H11 (when judgment result is YES), because there is a large possibility that it had been counterfeited, the packet processor 22 performs processing to discard the received packet (step S32) and the series of processing shown in FIG. 8 is ended.

If the received packet is judged not to require the extended header H11 (when the judgment result is NO), the packet processor 22 of the router 20a judges whether or not the received packet requires prevention of counterfeiting of the DSCP value (communication quality control information C2) (step S33). Specifically, the packet processor 22 judges whether or not the intention to perform prevention of counterfeiting of the communication quality control information in the packet is set into the router 20a. In the second operation, because this intention is set, the judgment result at step S33 is YES.

Then, the packet processor 22 performs encapsulation processing to encapsulate the received packet (step S34). Specifically, processing is done to add a new basic header H10 to a packet constituted by the basic header H1, the TCP/UDP header H2, and the payload P as shown in FIG. 6. In this case, the basic header H10 is used for the purpose of forwarding the packet within the network N (between the router 20a and the router 20c). For this reason, addresses of the router 20a and the router 20c are stored in the Transmission Source Address and Transmission Destination Address fields of the basic header H1, respectively.

Next, the packet processor 22 performs processing to write the DSCP value (communication quality control information C2) into the DSCP field of the new basic header H10 added to the packet (step S35). Following that, the packet processor 22 performs processing to write the DSCP value (communication quality control information C2) into the DSCP field of the original basic header H1 (step S36). The processing of either step S35 or step S35 may be performed first.

When the above processing ends, the encryption processor 25 calculates a message authentication code (HMAC), using the packet generated by the packet processor 22 (the packet in which the DSCP value (communication quality control information C2) has been written and encapsulated) and the secret shared key K1 (step S37). When the message authentication code is calculated, the extended header generation unit 22a of the packet processor 22 generates the extended header H11 shown in FIG. 6 (the extended header H11 in which the message authentication code or the like is stored in the Option field F13) and adds it to the encapsulated packet (step S38).

When the above processing ends, the forwarding unit 24 performs QoS processing (step S28). Specifically, based on the DSCP value (communication quality control information C2) stored in the DSCP field of the basic header H10 of the generated packet, the forwarding unit 24 controls the priority level using DiffServ. Then the forwarding unit 24 controls the packet processor 22 to output to the communication unit 21b the packet, which is transmitted toward the controller 30 (step S29).

If a setting is not made to the effect that prevention of counterfeiting of the communication quality control information is to be done with respect to the packet, the judgment result at step S33 is NO, and the packet processor 22 performs writing processing of the DSCP value (communication quality control information C2) into the DSCP flied of the basic header H1 of the received packet (Step S39). Then, the forwarding unit 24 performs QoS processing (step S28), outputs to the communication unit 21b the packet in which the DSCP value (communication quality control information C2) has been written into the basic header H1, and transmits it toward the controller 30 (step S29).

The packet transmitted toward the controller 30 from the router 20a is successively received by the router 20b and the router 20c. In this case, if the extended header H11 storing the message authentication code (HMAC) has been added to the packet transmitted toward the controller 30 from the router 20a, at the routers 20b and 20c, the same processing is performed as performed by the router 20a described regarding the first operation.

That is, the properness of the message authentication code (HMAC) stored in the extended header H11 of the packet is evaluated and, if the evaluation is that it is proper, QoS processing is performed, after which processing is performed to forward the packet. If, however, the evaluation is that the message authentication code is not proper, processing is performed to discard the packet. In this manner, because a packet suspected of having a counterfeited DSCP value (communication quality control information C2) is discarded at any one of the routers 20a to 20c, it is possible to prevent the influence of counterfeited packets.

In this case, basic header H10 encapsulates the packet transmitted from the router 20a toward the controller 30, and the address of the router 20c is stored in the Transmission Destination Address field of the basic header H10. For this reason, the forwarding unit 24 of the router 20c that has received the packet transmitted from the router 20a toward the controller 30 judges that the packet is addressed to its own node.

This results in a judgment result of YES at step S27 in FIG. 8, so that processing to release the encapsulation (decapsulation) is performed at the packet processor 22 (step S40). Specifically, processing is performed to delete the basic header H10 and the extended header H11 shown in FIG. 6. When the above processing ends, the forwarding unit 24 performs QoS processing (step S28) and the packet having the basic format shown in FIG. 4 is transmitted from the router 20c toward the controller 30 (step S29).

In the first embodiment, as noted above, if the routers 20a to 20c receive a packet to which has been added an extended header H11 into which a message authentication code is stored, the properness of the message authentication code stored in the extended header H11 is evaluated. Then, if the evaluation is that the message authentication code stored in the extended header H11 is proper, QoS processing is done and the packet is subjected to forwarding processing. If the evaluation is that the message authentication code stored in the extended header H11 is not proper, processing is performed to discard the packet. For this reason, because a packet suspected of having a counterfeited DSCP value (communication quality control information C1 and C2) is discarded at any one of the routers 20a to 20c, it is possible to prevent the influence of counterfeited packets.

When an edge router (the router 20a) receives a packet to which the extended header H11 storing the message authentication code is not added, if a judgment is made that this is not a packet that normally requires the extended header H11, in addition to writing the communication quality control information C2 into the basic headers H1 and H10 of the packet, the extended header H11 storing the message authentication code is added to the packet. This enables prevention of the influence of a counterfeit packet, even if a packet to which the extended header H11 storing the message authentication code is not added is transmitted.

Second Embodiment

In the first embodiment, the extended header H11, in which the message authentication code is stored, is added to a packet and a judgment is made as to whether or not the communication quality control information stored in the header of the packet is counterfeit, thereby preventing the influence of counterfeit packets. Although the first embodiment is very effective in preventing the influence of counterfeit packets, it cannot prevent the influence of misused proper packets (for example, the storage of a proper packet, to which the extended header H11 is added, and repeated continuous transmission thereof). The second embodiment prevents the influence of such improper behavior.

Figure 9:
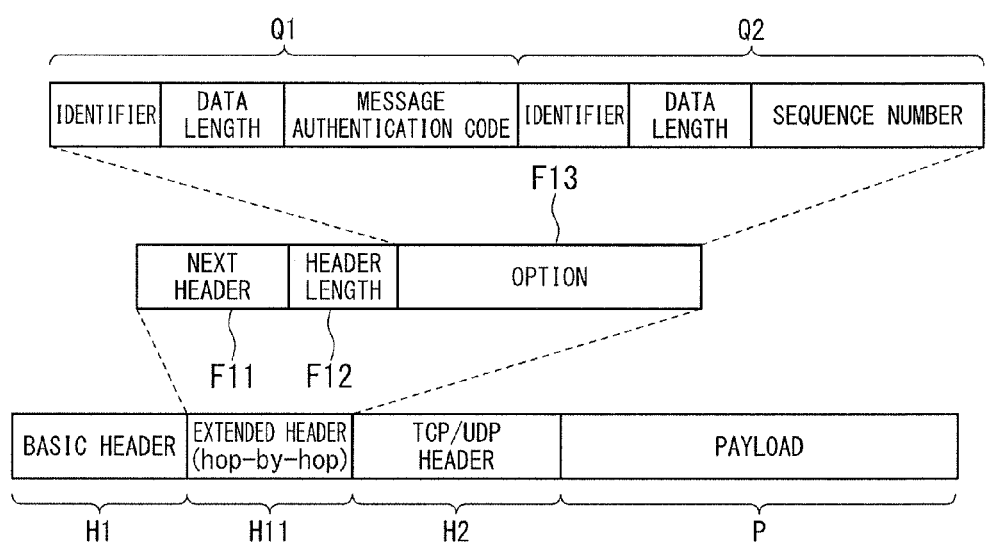
FIG. 9 is a drawing showing a format of a packet used in a second embodiment of the present invention.

FIG. 9 shows the format of a packet used in the second embodiment of the present invention.

As shown in FIG. 9, a basic header H1, an extended header H11, a TCP/UDP header H2, and a payload P constitute the packet used in the second embodiment, similar to the packet shown in FIG. 5. In this case, however, the addition of information stored in the Option field F13 of the extended header H11 is a point of difference with respect to the packet shown in FIG. 5.

Specifically, the Option field F13 of the extended header H11 stores a set of option information Q1, which is an identifier, a data length, and a message authentication code, and a set of option information Q2, which is an identifier, a data length, and a sequence number. In this case, the identifier of the option information Q2 indicates that a sequence number is included in the option information Q2. The data length in the option information Q2 is the data length of the sequence number included in the option information Q2. The sequence number in the option information Q2 is a number indicating the transmission sequence of a group of packets to be successively transmitted toward the transmission destination.

The packet shown in FIG. 9 is generated by the packet processor 13 of the field device 10 shown in FIG. 2 or the packet processor 22 of the routers 20a and 20c shown in FIG. 3. An extended header H11 storing such a sequence number is added to the packet and, if a plurality of packets storing the same sequence number have been transmitted, these packets are discarded, thereby preventing the influence of the above-described behavior of misusing a normal packet.

Figure 10:
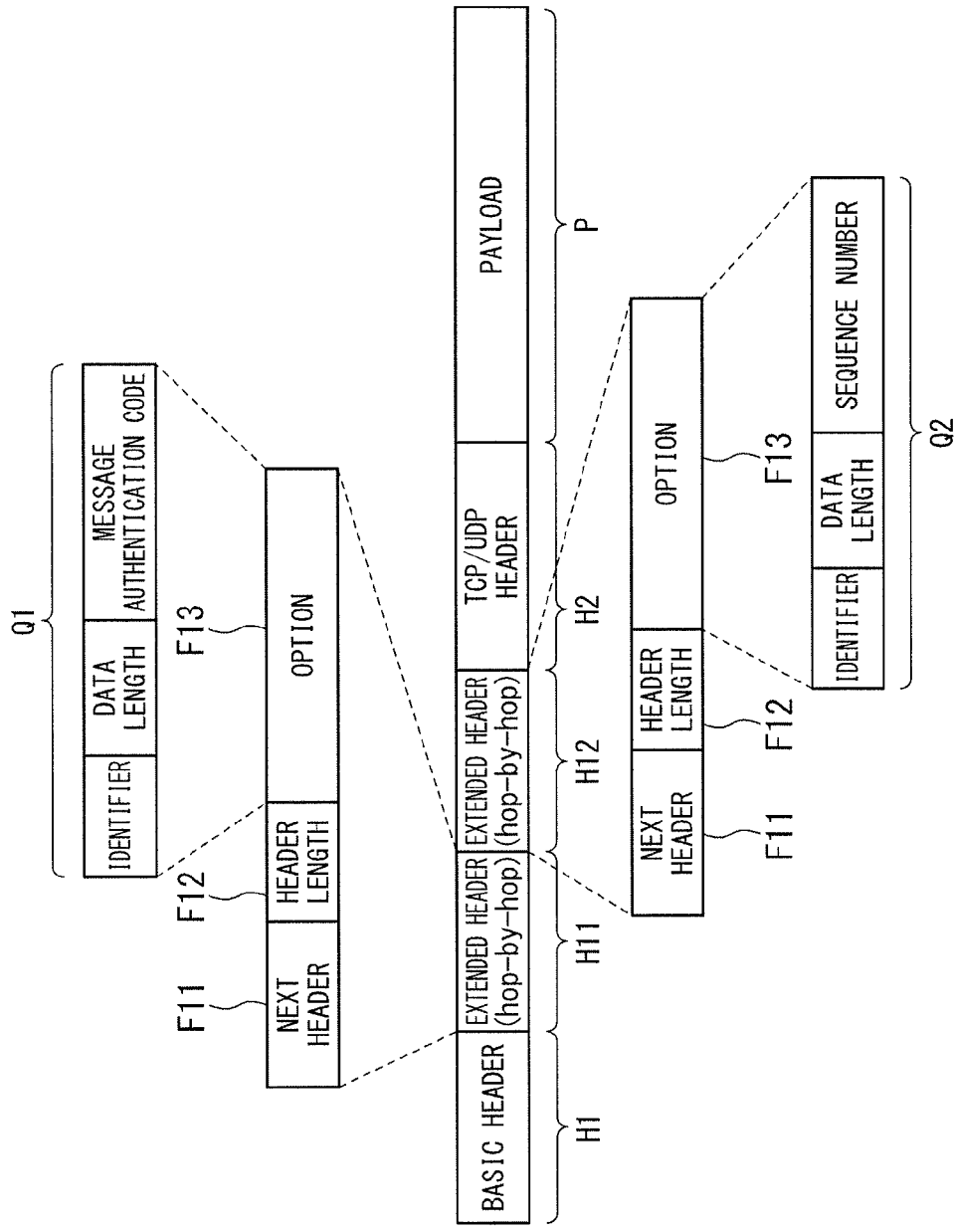
FIG. 10 is a drawing showing another format of a packet used in the second embodiment of the present invention.

FIG. 10 shows another format of a packet used in the second embodiment of the present invention. In the packet shown in FIG. 9, the option information Q1 including the message authentication code and the option information Q2 including the sequence number are stored in the same extended header H11. In contrast, in the packet shown in FIG. 10 the two extended headers H11 and H12 are added. The option information Q1 including the message authentication code is stored in the extended header H11, and the option information Q2 including the sequence number is stored in the extended header H12. The message authentication code may be calculated using the sequence number included in the above-noted extended header H12.

Third Embodiment

In an environment in which the priority level is controlled using DiffServ, which is a type of QoS technology, if the priority level is set to a certain level using the same DSCP value (communication quality control information) and, if the data stored in the payload P is the same, the message authentication code (HMAC) stored in the extended header H11 of each packet is the same. For this reason, if this message authentication code is obtained and stored in the extended header of an improper packet, it is possible to counterfeit a packet. The third embodiment prevents this type of packet counterfeiting.

Figure 11:
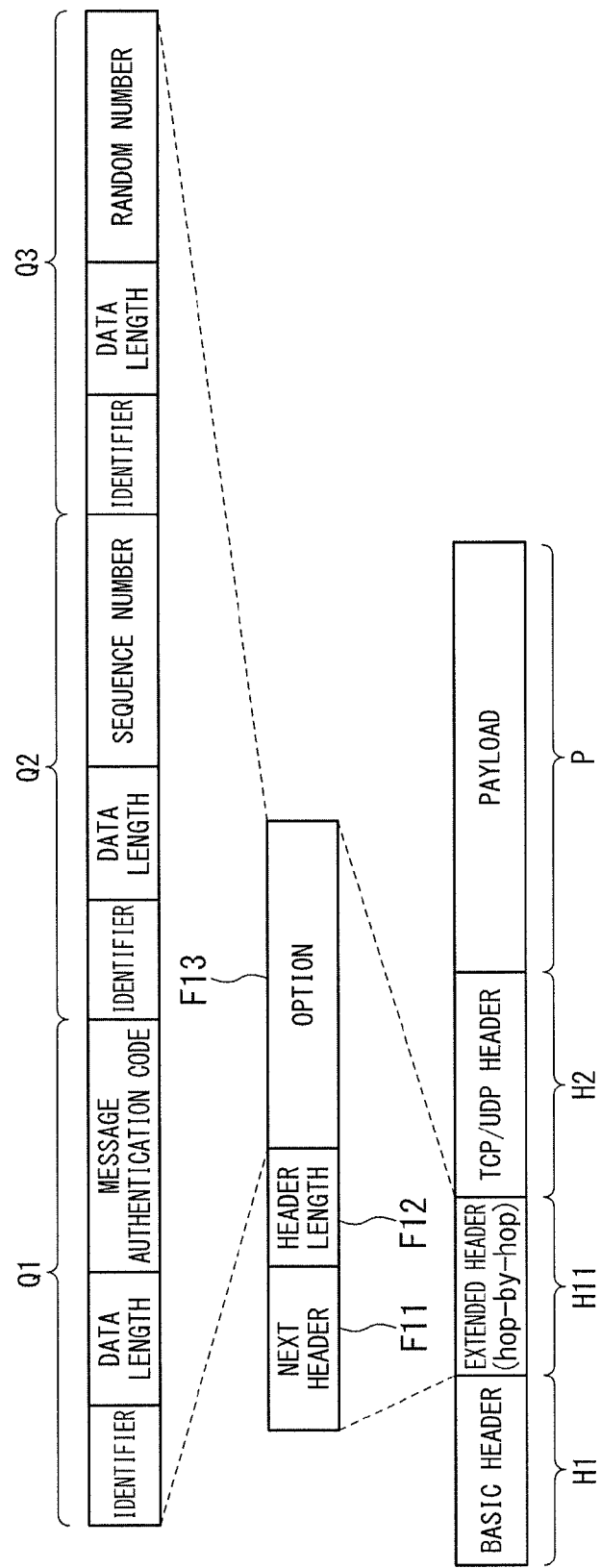
FIG. 11 is a drawing showing a format of a packet used in a third embodiment of the present invention.

FIG. 11 shows the format of a packet used in the third embodiment of the present invention. As shown in FIG. 11, similar to the packet shown in FIG. 9, a basic header H1, an extended header H11, a TCP/UDP header H2, and a payload P constitute the packet used in the third embodiment. In this case, however, the additional of information stored in the Option field F13 of the extended header H11 is a point of difference with respect to the packet shown in FIG. 9.

Specifically, the Option field F13 of the extended header H11, in addition to a set of option information Q1, which is an identifier, a data length, and a message authentication code, and a set of option information Q2, which is an identifier, a data length, and a sequence number, stores a set of option information Q3, which is an identifier, a data length, and a random number. The identifier of the option information Q3 indicates that a random number is included in the option information Q3. The data length of the option information Q3 is the data length of the random number included in the option information Q3. The random number of the option information Q3 is used to make the value of the message authentication code included in the extended header H11 of each packet different.

That is, in the third embodiment, by calculating the message authentication code using a random number different for each packet, the value of the message authentication code is different for each packet.

In this case, when the properness of the message authentication code is evaluated at each of the routers 20a to 20c, because the random number used when the message authentication code was calculated is required, the random number is stored in the extended header H11. Because the sequence number included in the option information Q2 is also different for each packet, the message authentication code may be calculated using the sequence number, either in combination with, or without using, the random number.

The packet shown in FIG. 11 is generated by the packet processor 13 of the field device 10 shown in FIG. 2 or the packet processor 22 of the router 20a shown in FIG. 3. By using such a random number to calculate the message authentication code, because the message authentication codes stored in the extended headers H11 of each packet are mutually different, it is possible to prevent counterfeiting of packets as noted above.

Figure 12:
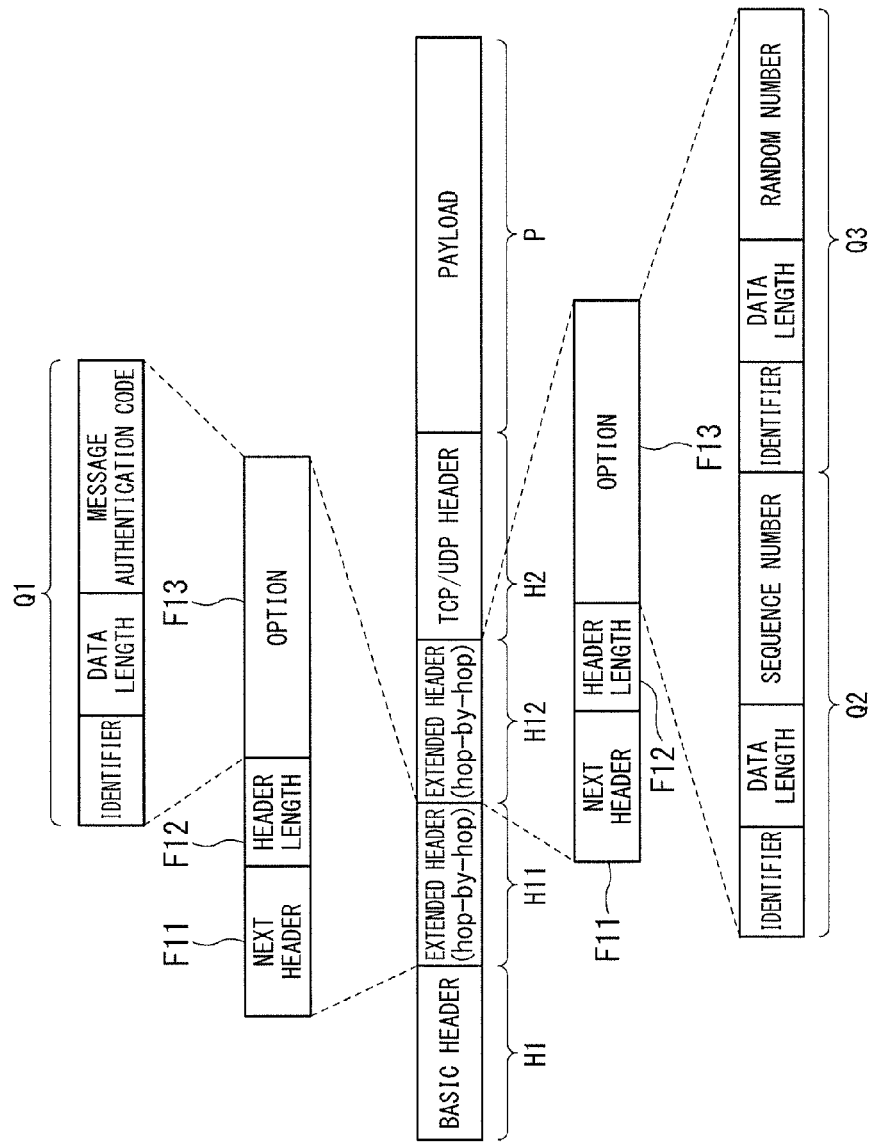
FIG. 12 is a drawing showing another format of a packet used in the third embodiment of the present invention.

FIG. 12 shows another format of a packet used in the third embodiment of the present invention. In the above-described packet shown in FIG. 11, the option information Q1 including the message authentication code, the option information Q2 including the sequence number, and the option information Q3 including the random number are stored in the same extended header H11. In contrast, in the packet shown in FIG. 12, there are added two extended headers, H11 and H12. The option information Q1 including the message authentication code is stored in the extended header H11, and the option information Q2 including the sequence number and the option information Q3 including the random number are stored in the extended header H12. In the packet used in the third embodiment, in addition to the extended headers H11 and H12, one more extended header may be added, with the option information Q1 including the message authentication code, the option information Q2 including the sequence number, and the option information Q3 including the random number being stored in mutually different extended headers.

Although packet forwarding devices and methods according to the first to third embodiments of the present invention have been described above, the present invention is not restricted to the above-described first to third embodiments, and can be freely modified within the scope thereof.

For example, although the above-described first to third embodiments have been described for the example of calculating the message authentication code for the overall packet, excluding the extended header, the message authentication code may be calculated for the basic header H1 and the TCP/UDP header H2 only. Also, the message authentication code may be calculated for the communication quality control information only. For example, this can be the DSCP value used in DiffServ or the value used in RSVP (transmission source address, transmission destination address, transmission source port, transmission destination port, and the like).

Also, in the above-described first to third embodiments, if the message authentication code (HMAC) stored in the extended header H11 of a received packet is evaluated to be improper, the routers 20a to 20c perform processing to discard the packet. It is desirable, however, that the routers 20a to 20c be capable of selecting between processing to discard the packet and processing that, while discarding the packet, also transmits an ICMP (Internet Control Message Protocol) error message.

In the above-described first to third embodiments, the packet generated by the router 20a is shown in FIG. 6 (the packet shown in FIG. 4, to which the extended header H11 is added, and the packet which is encapsulated by the basic header H10). However, the packet generated by the router 20a may be the same as the packet shown in FIG. 5 (the packet generated by the field device 10).

The above-described first to third embodiments have been described for the example in which the field device 10 and the routers 20a to 20c determine the message authentication code by performing a calculation (hashing calculation) using the secret shared key K1. However, as long as the completeness of the communication quality control information can be guaranteed, the message authentication code may be determined by a method other than that of calculation using the secret shared key K1.

Although it is desirable that there be one hop between the field device 10 and the router 20a and between the router 20c and the controller 30, a plurality of routers may exist therebetween, in which case it is desirable to rely on a means of assuring reliability different from the methods of the first to third embodiments.

The first to third embodiments have been described for the example in which a message authentication code is stored in an extended header H11 of a packet conforming to IPv6. However, the storage destination of the message authentication code is not restricted to being the extended header H11 of a packet conforming to IPv6. For example, the message authentication code may be stored in a MAC (Media Access Control) frame used in an Ethernet (registered trademark).

Also, if the network N is constituted by network switches, the above-described first to third embodiments may be applied, in which case a MAC header may store the message authentication code. The routers 20a to 20c do not need to be implemented by a single piece of hardware, and may be distributed among a plurality of pieces of hardware. For example, the routers 20a to 20c may be OpenFlow-capable network switches. If this type of network switch is used, a frame message authentication code may be stored in either of the extended header H11 or MAC header of a packet conforming to IPv6.

Additionally, although the above-noted first to third embodiments have been described regarding the communication system 1 that is based on a distributed control system (DCS) implemented in a plant, a factory, or the like, the above-noted first to third embodiments can be applied to a communication system (for example, an ITS (Intelligent Transport System for highway traffic), a power transmission grid, or a medical network) other than the communication system 1.

INDUSTRIAL APPLICABILITY

The present invention can be applied to a packet forwarding device, a packet forwarding system, and a packet forwarding method and the like required to prevent the influence of counterfeited packets.

DESCRIPTION OF REFERENCE SYMBOLS 20a to 20c Routers
22 Packet processor
23 Evaluation unit
24 Forwarding unit
25 Encryption processor
26 Memory
C1 Communication quality control information C2 Communication quality control information
H1 Basic header
H11 Extended header
K1 Secret shared key
N Network

The invention claimed is:

1. A packet forwarding device comprising:
an evaluator configured to perform a first judgment of whether or not an extended header for storing authentication information is added to a packet, the authentication information being for authenticating communication quality control information stored in a header of the packet transmitted via a network, and evaluate whether or not the authentication information is proper, the evaluation being made when the extended header for storing the authentication information is added to the packet;
an encryption processor configured to calculate the authentication information using at least pre-established communication quality control information, the calculation being made when the extended header is not added to the packet;
a packet processor configured to generate, as a packet to be transmitted toward a transmission destination, a packet in which the pre-established communication quality control information is added to the header and the extended header for storing the authentication information calculated by the encryption processor is added to the packet when the extended header is not added to the packet; and
a forwarder configured to control a communication quality, using the communication quality control information, and forward the packet toward the transmission destination, the control being made when the authentication information is evaluated by the evaluator to be proper, the forwarder controlling communication quality using the pre-established communication quality control information and forwarding the packet generated by the packet processor toward the transmission destination when the extended header is not added to the packet.

2. The packet forwarding device according to claim 1, further comprising:
a storage that stores a previously distributed secret shared key, wherein
the evaluator is configured to evaluate the authentication information, based on information calculated using the secret shared key stored in the storage and at least the communication quality control information stored in the header of the packet generated by the packet processor.

3. The packet forwarding device according to claim 1, further comprising:
a storage that stores a previously distributed secret shared key, wherein
the encryption processor is configured to calculate the authentication information using the secret shared key stored in the storage and at least the pre-established communication quality control information, and
the evaluator is configured to evaluate the authentication information, based on information calculated using the secret shared key stored in the storage and at least the communication quality control information stored in the header of the packet generated by the packet processor.

4. The packet forwarding device according to claim 1, wherein
the packet generated by the packet processor is discarded when the evaluator evaluates the authentication information to be improper.

5. The packet forwarding device according to claim 1, wherein, when the evaluator evaluates the authentication information to be proper, the forwarder is configured to judge, based on the header, whether or not the packet is addressed to the packet forwarding device.

6. The packet forwarding device according to claim 5, wherein, when the packet is judged by the forwarder to be addressed to the packet forwarding device, the forwarder deletes the header.

7. The packet forwarding device according to claim 5, wherein, when the packet is judged by the forwarder not to be addressed to the packet forwarding device, the forwarder is configured to perform the communication quality control and the forwarding.

8. The packet forwarding device according to claim 1, wherein
the packet processor includes in a packet to be transmitted toward the transmission destination a sequence number indicating the transmission sequence of a group of packets to be successively transmitted toward the transmission destination.

9. The packet forwarding device according to claim 1, wherein the packet processor includes in a packet to be transmitted toward the transmission destination a random number for the purpose of making the authentication information different for each packet.

10. A packet forwarding device comprising:
an evaluator configured to perform a first judgment whether or not authentication information is stored in a header, the authentication information being for authenticating communication quality control information stored in the header of a packet transmitted via a network, and evaluate whether or not the authentication information is proper, the evaluation being made when the authentication information is stored in the header;
a forwarder configured to control a communication quality using the communication quality control information, and forward the packet toward a transmission destination, the control being made when the authentication information is evaluated by the evaluator to be proper; and
a storage that stores information regarding whether or not a need to add an extended header to the packet exists, wherein
when the evaluator evaluates that the authentication information is not stored in the header, the evaluator determines whether or not the packet requires the addition of the extended header, based on the information stored in the storage.

11. The packet forwarding device according to claim 10, wherein
the packet is discarded when the first judgment is made, based on information stored in the storage, that the packet requires the addition of the extended header.

12. The packet forwarding device according to claim 10, wherein the storage further stores information regarding whether or not the packet requires counterfeiting prevention, wherein
when the first judgment is made, based on information stored in the storage, that the packet does not require the addition of the extended header, a second judgment is made, based on information stored in the storage, regarding whether or not the packet requires counterfeiting prevention.

13. The packet forwarding device according to claim 12, wherein the communication quality control information is stored into a different header that is different from the header when the second judgment is made, based on information stored in the storage, that the packet requires counterfeiting prevention.

14. The packet forwarding device according to claim 12, wherein the communication quality control information is stored into the header when the second judgment is made, based on information stored in the storage, that the packet does not require counterfeiting prevention.

15. A packet forwarding method comprising:

judging whether or not authentication information is stored in a header, the authentication information being for authenticating communication quality control information stored in the header of a packet transmitted via a network;

evaluating whether or not the authenticating information is proper, the evaluation being made when the judgment is made that the authentication information is stored in the header;

controlling a communication quality using the communication quality control information, and forwarding the packet toward a transmission destination the control being made when the authentication information is evaluated to be proper;

storing information regarding whether or not a need to add an extended header to the packet exists; and when evaluated that the authentication information is not stored in the header, determining whether or not the packet requires the addition of an extended header, based on the information that has been stored.

16. The packet forwarding method according to claim 15, further comprising:

calculating the authentication information using at least pre-established communication quality control information when the judgment is made that the authentication information is not stored in the header;

generating a packet in which the pre-established communication quality control information and the calculated authentication information are added to the header; and controlling communication quality using the pre-established communication quality control information and forwarding the generated packet toward the transmission destination.

\* \* \* \* \*